(12) United States Patent
Shimoda

(10) Patent No.: US 7,054,063 B2
(45) Date of Patent: May 30, 2006

(54) PROJECTION SCREEN AND ITS MANUFACTURING METHOD

(75) Inventor: Kazuhito Shimoda, Kanagawa (JP)

(73) Assignee: Sony Corporation, Tokyo (JP)

( * ) Notice: Subject to any disclaimer, the term of this patent is extended or adjusted under 35 U.S.C. 154(b) by 194 days.

(21) Appl. No.: 10/626,478

(22) Filed: Jul. 24, 2003

(65) Prior Publication Data

US 2004/0240053 A1 Dec. 2, 2004

(30) Foreign Application Priority Data

Jul. 24, 2002 (JP) ............................. 2002-215666
Sep. 4, 2002 (JP) ............................. 2002-259027

(51) Int. Cl.
*G03B 21/56* (2006.01)
*G03B 21/60* (2006.01)

(52) U.S. Cl. ....................... 359/459; 359/443; 359/454

(58) Field of Classification Search ................ 359/443, 359/454, 459, 449
See application file for complete search history.

(56) References Cited

U.S. PATENT DOCUMENTS 4,006,965 A * 2/1977 Takada et al. .............. 359/443
6,707,605 B1 * 3/2004 Sekiguchi .................. 359/443
6,724,529 B1 * 4/2004 Sinkoff ....................... 359/443
2004/0061935 A1 * 4/2004 Ohsako et al. ............. 359/449
2004/0150883 A1 * 8/2004 Shimoda et al. ............ 359/443
2005/0078366 A1 * 4/2005 Takahashi et al. .......... 359/443

* cited by examiner

*Primary Examiner*—W. B. Perkey
*Assistant Examiner*—Magda Cruz
(74) *Attorney, Agent, or Firm*—Wolf, Greenfield & Sacks, P.C.

(57) ABSTRACT

The invention provides a projection screen, wherein clear images can be obtained without being influenced by projection environments, the flexibility can be obtained, and its manufacturing cost can be reduced and its manufacturing method. An optical multilayer film is formed on a transparent substrate by alternately layering metal films and dielectric films by using spattering. This multilayer film has the high reflection characteristics in relation to three primary colors wavelength bands lights, and has the high absorption characteristics in relation to lights other than the three primary colors wavelength bands lights. Therefore, the white level and the black level of images can be raised. Further, in terms of the optical multilayer film, as the film thickness dependence of the reflectance change becomes smaller and the incidence angle dependence of reflectance change becomes smaller, a wide visual field angle can be obtained.

4 Claims, 11 Drawing Sheets

PROJECTION SCREEN AND ITS MANUFACTURING METHOD

BACKGROUND OF THE INVENTION

1. Field of the Invention

The present invention relates to a projection screen which displays images by receiving lights from a light source and its manufacturing method, and more particularly to a reflection type projection screen and its manufacturing method.

2. Description of the Related Art

Recently, overhead projectors and slide projectors are widely used as means for presenters to present materials in meetings and the like. In general households, video projectors and moving image film projectors are getting popular. In these projector units, lights outputted from a light source are spatially modulated to image lights by a light valve, and these image lights are projected on a projection screen through an illumination optical system such as a lens.

Some of this kind of projector units can display color images. In this case, a lamp, emitting white lights which contain three primary colors: red (R), green (G), and blue (B) is used as a light source, and a transmissive liquid crystal panel is used as a light valve. In this projector unit, the white light emitted from the light source is divided into a red ray, a green ray, and a blue ray by a illumination optical system, and these rays are converged on each given light path. These beams of light are spatially modulated by the liquid crystal panel corresponding to image signals. The modulated beams of light are combined as color image lights by a light composite part, and the combined color image lights are extended and projected on a projection screen by a projection lens.

Additionally, lately, as a projector unit which allows for displaying color images, a unit, using a narrow-spectrum three primary colors light source, e.g., a laser oscillator emitting respective narrow-spectrum lights for three primary colors as a light source, and using a grating light valve (GLV) as a light valve, has been developed. In this projector unit, each beam of light for each color emitted from the laser oscillator is spatially modulated by the GLV corresponding to image signals. The beams of light modulated in this way are combined as color image lights by a light composite part as in the projector unit. These combined color image lights are extended and projected on a projection screen by a projection lens.

Projection screens used for projector units are fell into two types: a transmission type wherein projection lights are illuminated from the rear side of the projection screen and seen at the front side; and a reflection type wherein projection lights are illuminated from the front side of the projection screen, and the reflected lights are seen at the front side. In either type, obtaining bright and high-contrast images are desired in order to realize a screen with good visibility. Further, in order to improve the storage efficiency, a projection screen, using polymeric materials as materials for a substrate and utilizing the flexibility of these polymeric materials is desired.

However, a projection screen, allowing for obtaining bright and high-contrast images and having the flexibility has not been realized. For example, in a projection screen 1000 shown in FIG. 1, the surface shape of the screen is devised by forming convex parts 1112A on the surface of a transparent layer 1112, and forming opaque layers 1113, made of blacking on the side surface of these convex parts 1112A, so that the black level is lowered and the brightness and the contrast are raised (for example, Japanese Patent No. 2889153) However, in this case, there are problems that its manufacturing cost is higher as lots of time and labor are taken with e.g. a process to form the convex parts 1112A and a process to form the opaque layers 1113, and the flexibility cannot be obtained.

Further, a projection screen 2000 shown in FIG. 2 comprises a substrate 1211. On the substrate 1211, a reflection layer 1212, a light absorption layer 1213, and a diffusion layer 1214 are sequentially formed (for example, Japanese Patent No. 3103802). The projection screen 2000 having such constitution has the flexibility as a whole, since its all layers are flexible. However, there are problems that as the position of the light absorption layer 1213 is closer to the light-entrance face side than the position of the reflection layer 1212 is, and almost all incidence lights are absorbed into the light absorption layer 1213, the white level is lowered, resulting in inability to obtain sufficient brightness and contrast.

Further, in the projection screen 2000, in the case where a light enters the screen face from the oblique direction, the light enters in a direction obliquely into the face of the reflection layer 1212, resulting in the change of the reflection characteristics and the occurrence of the color shift. Therefore, the color contrast is lowered and vivid images cannot be obtained. In particular, when the screen face is larger, such problem appears significantly.

SUMMARY OF THE INVENTION

It is a first object of the invention to provide a projection screen, wherein clear and vivid images can be obtained without being influenced by projection environments; the flexibility can be obtained; and the productivity can be improved, and its manufacturing method.

It is a second object of the invention to provide a projection screen, wherein its screen size can be enlarged and its manufacturing cost can be reduced, and its manufacturing method.

A projection screen according to the invention comprises a substrate, and light selective reflection layer which is formed on one side of the substrate, which has the reflection characteristics in relation to lights in specific wavelength bands, and which has the absorption characteristics in relation to lights other than the lights in the specific wavelength bands. Namely, in this projection screen, due to the light selective reflection layer, the reflection characteristics in relation to the lights in the specific wavelength bands are shown, and the absorption characteristics in relation to the lights other than the lights in the specific wavelength bands are shown. In result, high light-dark contrast images can be obtained.

This projection screen is manufactured through a process, wherein the light selective reflection layer, having the reflection characteristics in relation to the lights in the specific wavelength bands and having the absorption characteristics in relation to the lights other than the lights in the specific wavelength bands is formed on the substrate by using spattering.

In the projection screen according to the invention, an angle correction layer which is formed on the light selective reflection layer on the side opposite to the substrate, and which allows lights to enter in a direction perpendicular to the surface of the light selective reflection layer may be formed. Thereby, the change of the reflection characteristics in the light reflection layer is prevented, the color shift hardly occurs, resulting in the improvement of the color contrast of images.

This projection screen is manufactured through the steps of forming a light reflection layer having the high reflection characteristics in relation to the lights in the specific wavelength bands, and the high transmission characteristics in relation to at least the lights in the visible wavelength band other than the specific wavelength bands on the substrate by using coating method; and forming an angle correction layer which allows lights to enter in a direction perpendicular to a surface of the light reflection layer on the light reflection layer.

Other and further objects, features and advantages of the invention will appear more fully from the following description.

DETAILED DESCRIPTION OF THE PREFERRED EMBODIMENTS

Detailed descriptions of embodiments of the invention will now be made with reference to the drawings.

[First Embodiment]

Figure 1:
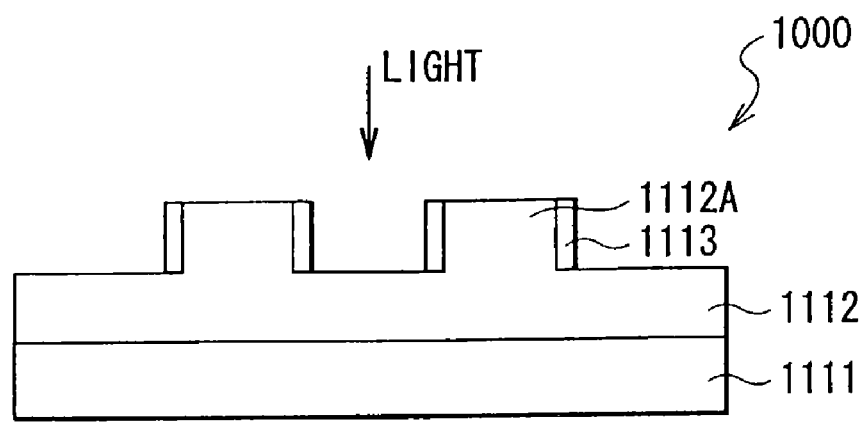
FIG. 1 is a schematic constitution view of a conventional projection screen.
Figure 2:
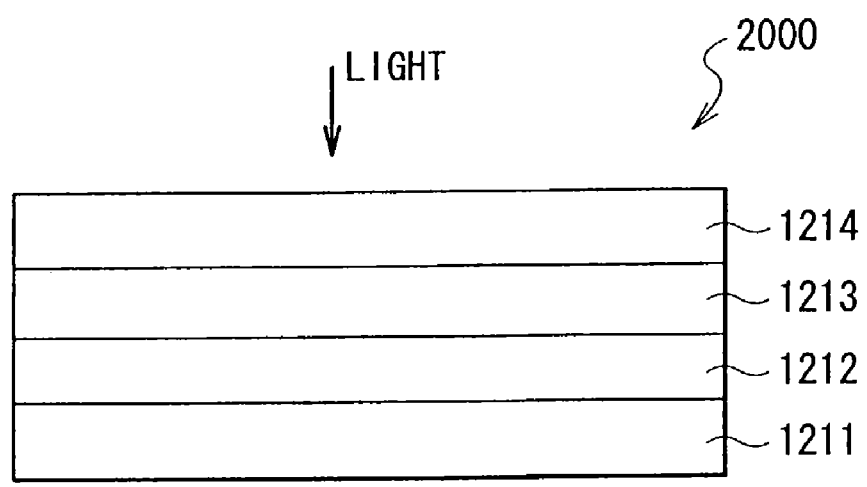
FIG. 2 is a schematic constitution view of other conventional projection screen.
Figure 3:
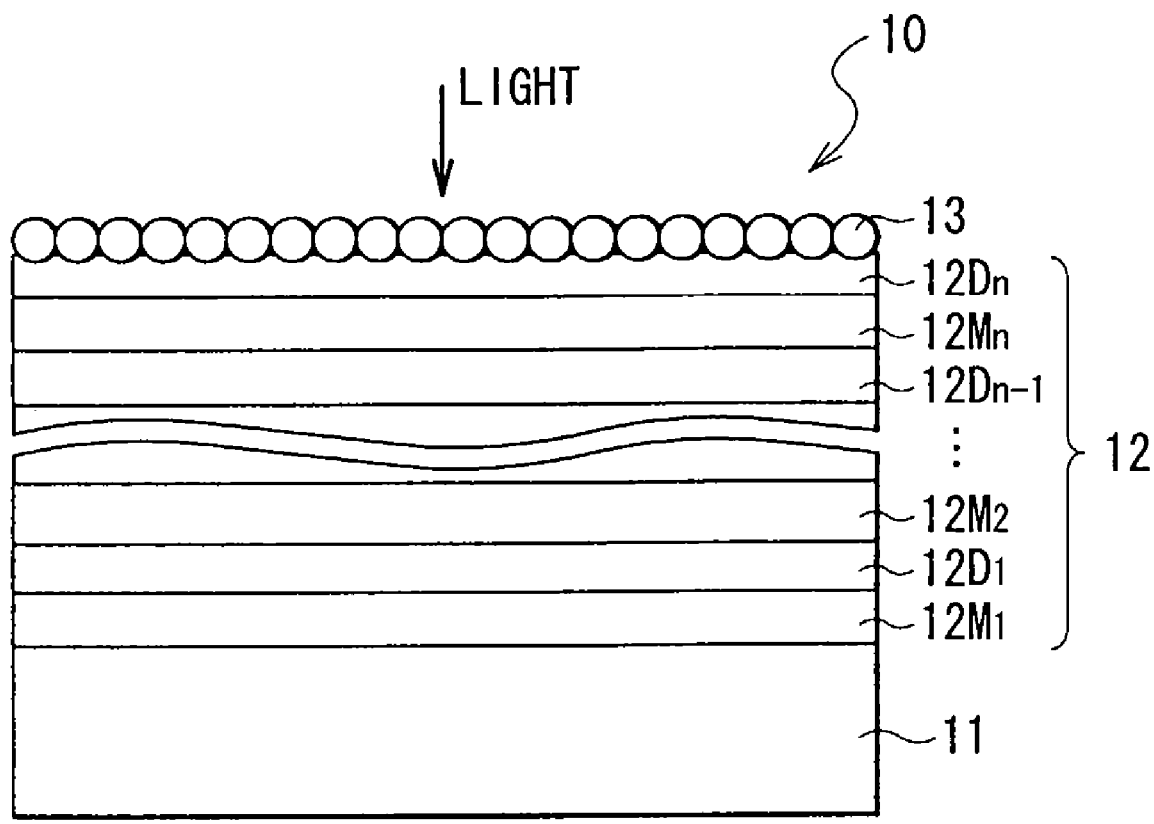
FIG. 3 is a schematic constitution view of a projection screen according to a first embodiment of the invention.

FIG. 3 shows a cross-sectional constitution of part of a projection screen 10 according to a first embodiment of the invention. This projection screen 10 is, namely, a reflection type projection screen. The projection screen 10 comprises a transparent substrate 11. On the transparent substrate 11, an optical multilayer film 12 is formed as light selective reflection layer. This optical multilayer film 12 has the high reflection characteristics in relation to lights in the specific wavelength bands, and has the high absorption characteristics in relation to lights other than the lights in the specific wavelength bands. Details about this will be described later. On the optical multilayer film 12, a light diffusion layer 13 is formed.

The transparent substrate 11 is, for example, made of polymeric materials, and has a thickness of 188 μm and flexibility. As polymeric materials, for example, polycarbonate (PC), polyethylene terephthalate (PET), polyethylene naphthalate (PEN), polyether sulfone (PES), and polyolefin (PO) are listed.

The optical multilayer film 12 is a film, wherein metal films $12M_p$ and dielectric films $12D_p$ are alternately layered (where p is a positive number of 1–n). Namely, the optical multilayer film 12 is a film, wherein a metal film $12M_1$, a dielectric film $12D_1$, a metal film $12M_2$, a dielectric film $12D_2$..., a metal film $12M_n$, and a dielectric film $12D_n$ are sequentially layered. The metal films $12M_p$ are made of niobium (Nb), aluminum (Al), or silver (Ag). For example, in the case where Al is used for the metal films $12M_p$, an average reflectance in the optical multilayer film 12 becomes larger, and the upper limit of the average reflectance is determined by this Al. Meanwhile, in the case where Nb is used for the metal films $12M_p$, an average reflectance in the optical multilayer film 12 becomes smaller, and the lower limit of the average reflectance is determined by this Nb. The dielectric films $12D_p$ are made of niobium pentoxide ($Nb_2O_5$), titanium dioxide ($TiO_2$), tantalum pentoxide ($Ta_2O_5$), allumina ($Al_2O_3$), or silicon dioxide ($SiO_2$).

Each film thickness of the optical multilayer film 12 is designed to have the high reflection characteristics, for example, reflectance of 70% or more in relation to three primary colors wavelength bands lights consisted of red, green and blue wavelength bands lights, for example. Additionally, each film thickness of the optical multilayer film 12 is designed to have the high absorption characteristics, for example, absorptance of 80% or more in relation to the lights in the wavelength bands other than the three primary colors wavelength bands. Each film thickness of the optical multilayer film 12 is designed so that an optical thickness of each film nd satisfies the following Equation 1 in relation to a wavelength of incidence light λ:

$$nd=\lambda(\alpha\pm 1/4) \text{ (provided } \alpha \text{ is a natural number)} \quad \text{[Equation 1]}$$

where each film thickness is d, a refractive index of each film is n, and a wavelength of incidence light which enters this optical multilayer film is λ.

Figure 4:
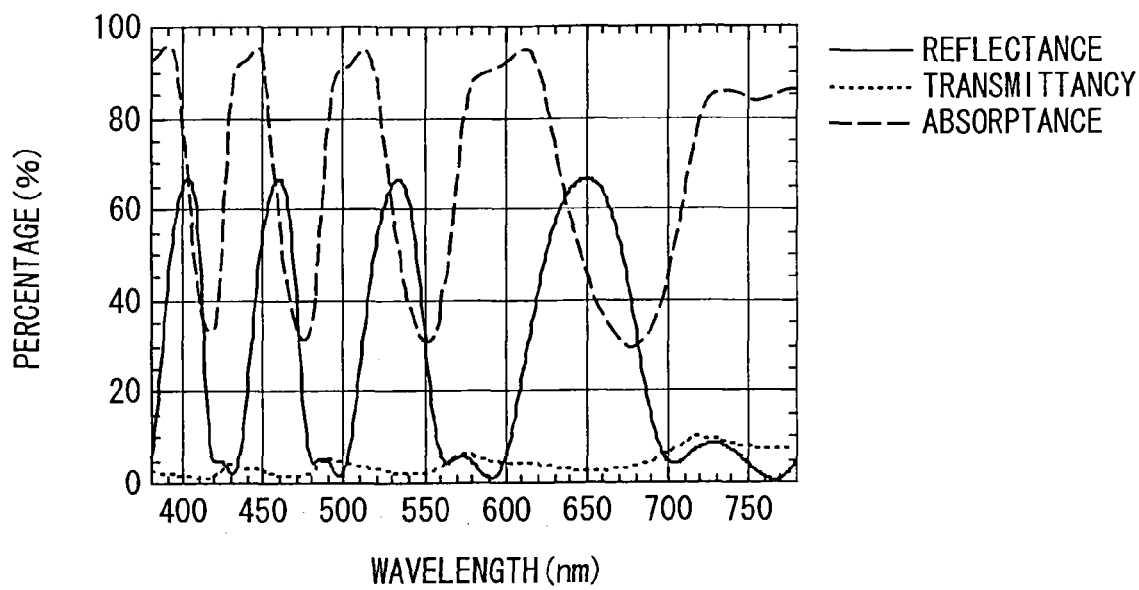
FIG. 4 illustrates the optical characteristics of an optical multilayer film of the projection screen shown in FIG. 3.

For example, the film is designed to use Nb for the metal film $12M_1$, $Nb_2O_5$ for the dielectric film $12D_1$, Nb for the metal film $12M_2$, and $Nb_2O_5$ for the dielectric film $12D_2$, resulting in total number of layers of four, and to have the optical characteristics as shown in FIG. 4. Namely, design is made so that the optical multilayer film 12 has high reflectance, e.g. reflectance of 70% in relation to the three primary colors wavelength bands lights (wavelength of red light is 642 nm, wavelength of green light is 532 nm, and wavelength of blue light is 457 nm); has high absorptance, e.g. absorptance of 80% or more in relation to the lights in the wavelength bands other than the three primary colors wavelength bands; and has transmittancy of e.g. 5–10% in relation to lights in all wavelength bands. Due to such design, layer thicknesses are, 40 nm for the metal film $12M_1$, 553 nm for the dielectric film $12D_1$, 20 nm for the metal film $12M_2$, and 553 nm for the dielectric film $12D_2$.

As the optical multilayer film 12 having such constitution has the high reflection characteristics in relation to the three primary wavelength bands lights, and has the high absorption characteristics in relation to the lights other than the three primary colors wavelength lights, the white level and the black level of the screen are raised. Further, as the total number of the layers of the optical multilayer film 12 becomes less and its film thickness becomes smaller, the flexibility can be obtained. Each wavelength of the three primary colors wavelength lights is a wavelength of each color's laser emitted from a light source (laser oscillator 21) of a projector unit 20 (FIG. 10) which will be described later.

Figure 5:
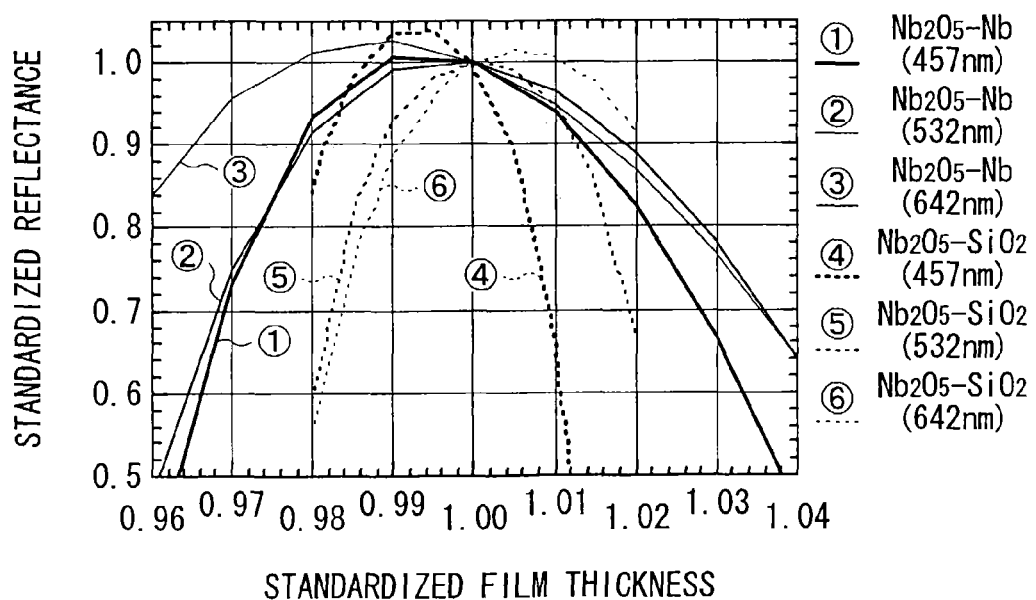
FIG. 5 is an illustration which compares the reflection characteristics between the optical multilayer film of the projection screen shown in FIG. 3 and an optical membrane of a projection screen of a comparative example.
Figure 6:
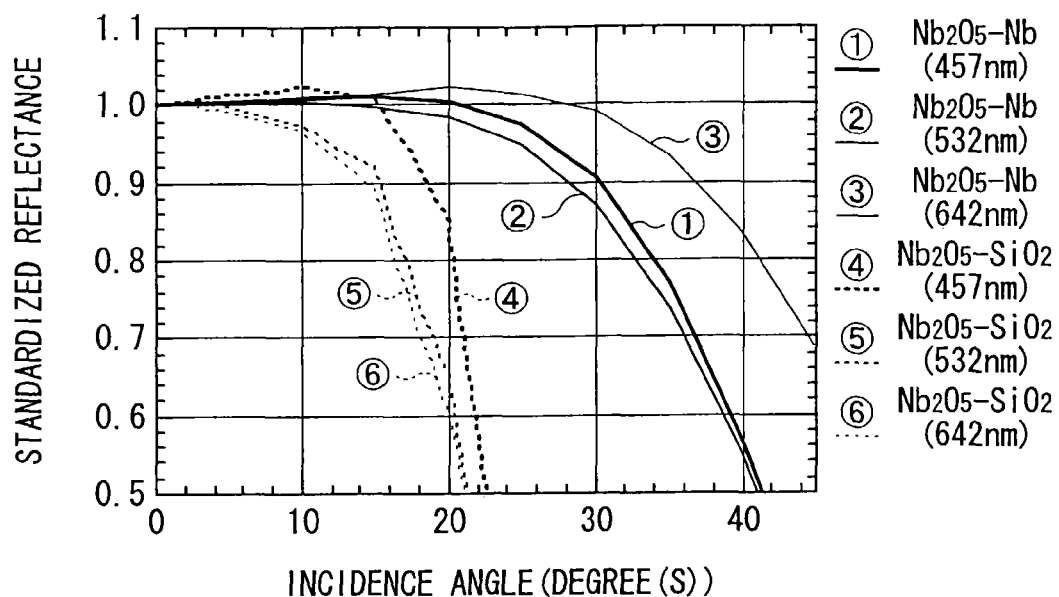
FIG. 6 is an illustration which compares the reflection characteristics between the optical multilayer film of the projection screen shown in FIG. 3 and the optical membrane of the projection screen of the comparative example.

Further, in this case, when all film thicknesses are changed at the same rate with reference to the thicknesses of the metal film $12M_1$, the dielectric film $12D_1$, the metal film $12M_2$, and the dielectric film $12D_2$, the reflectance change becomes ①–③ as shown in FIG. 5 in each wavelength band of the three primary colors wavelength bands lights. Furthermore, when their incidence angles in relation to the screen are changed, the reflectance change becomes ①–③ as shown in FIG. 6 in each wavelength band of the three primary colors wavelength bands lights. As a comparative example from a presentation by the same applicant as the applicant of this application in Patent Application No. 2002-070799, the film thickness dependence of the reflectance change is shown as ④–⑥ in FIG. 5, as well as the incidence angle dependence of the reflectance change is shown as ④–⑥ in FIG. 6, in terms of an optical membrane of a projection scren thereof. This optical membrane is a film, wherein high refractive index layers and low refractive index layers whose refractive indices are lower than that of high refractive index layers are alternately layered. Niobium pentoxide ($Nb_2O_5$) is used for the high refractive index layers, and silicon dioxide ($SiO_2$) is used for the low refractive index layers.

As shown in FIG. 5, in this embodiment, when the film thickness of the optical multilayer film 12 is changed, the film thickness dependence of the reflectance change becomes smaller compared to in the comparative example. Further, as shown in FIG. 6, in this embodiment, when the incidence angle in relation to the screen is changed, the incidence angle dependence of the reflectance change becomes smaller compared to in the comparative example. In this case, particularly, as Nb is used for the metal film $12M_1$ and the metal film $12M_2$, the incidence angle dependence of the reflectance change becomes small, and the characteristics of wide visual field angle can be obtained.

Figure 7:
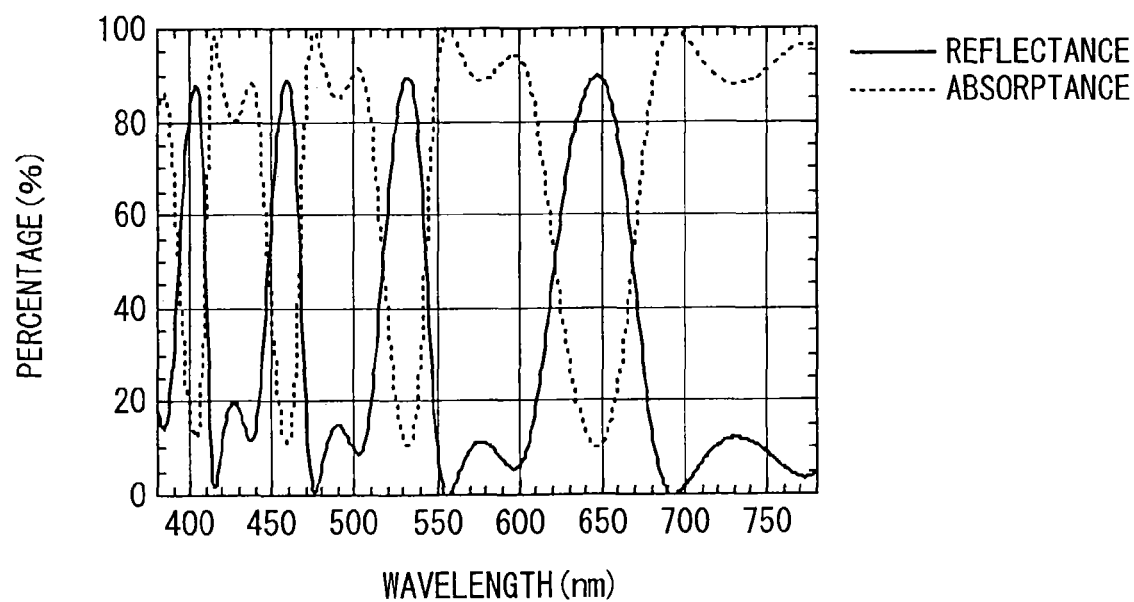
FIG. 7 illustrates the optical characteristics of the optical multilayer film of the projection screen shown in FIG. 3.

Further, for example, the film is designed to use Al for the metal film $12M_1$, $Nb_2O_5$ for the dielectric film $12D_1$, Nb for the metal film $12M_2$, and $Nb_2O_5$ for the dielectric film $12D_2$, resulting in total number of layers of four, and to have the optical characteristics as shown in FIG. 7. Namely, design is made so that the optical multilayer film 12 has high reflectance, e.g. reflectance of 80% in relation to the three primary colors wavelength bands lights; has high absorptance, e.g. absorptance of 90% or more in relation to the lights other than the three primary colors wavelength bands lights; and has transmittancy of e.g. approximate 0% in relation to all wavelength bands lights. Due to such design, film thicknesses are, 50 nm for the metal film $12 M_1$, 551 nm for the dielectric film $12D_1$, 15 nm for the metal film $12M_2$, and 551 nm for the dielectric film $12D_2$.

As the optical multilayer film 12 having such constitution has the high reflection characteristics in relation to the three primary colors wavelength bands lights, and the high absorption characteristics in relation to the lights other than the three primary colors wavelength bands lights, the white level and the black level of the screen can be raised. Further, as the total number of the layers for the optical multilayer film 12 becomes less, the flexibility can be obtained.

Figure 8:
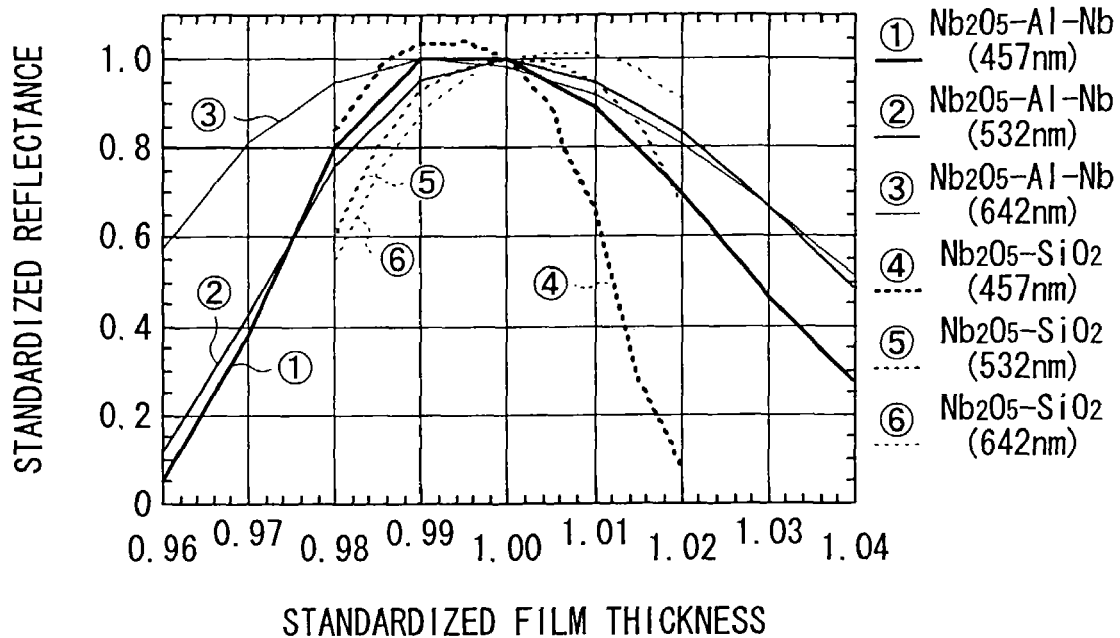
FIG. 8 is an illustration which compares the reflection characteristics between the optical multilayer film of the projection screen shown in FIG. 3 and the optical membrane of the projection screen of the comparative example.
Figure 9:
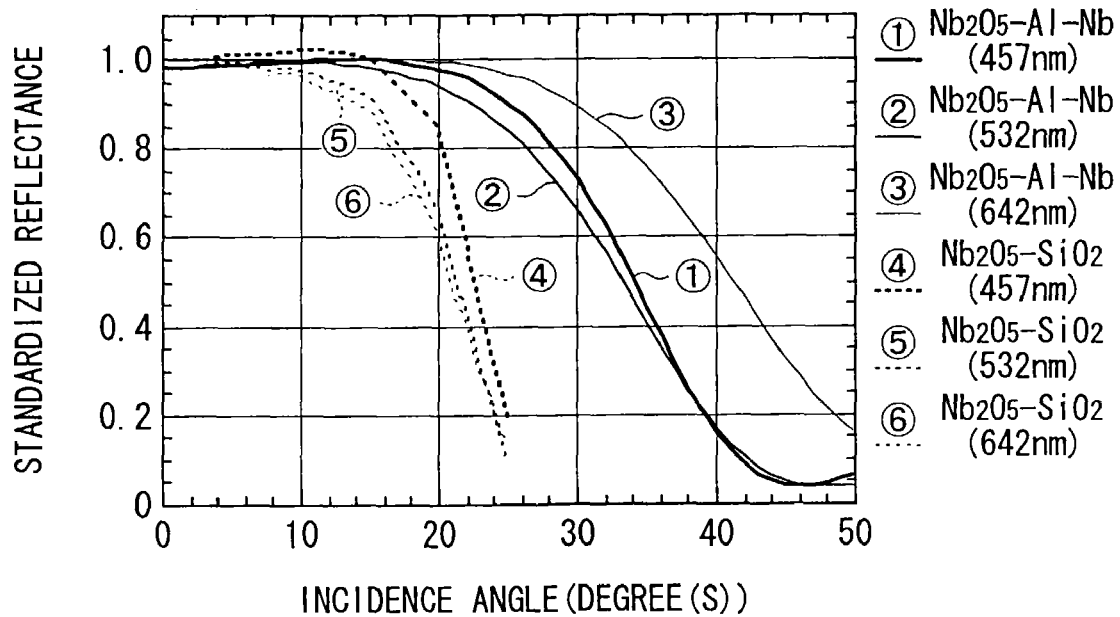
FIG. 9 is an illustration which compares the reflection characteristics between the optical multilayer film of the projection screen shown in FIG. 3 and the optical membrane of the projection screen of the comparative example.

Further, in this case, when all film thicknesses are changed at the same rate with reference to the thicknesses of the metal film $12M_1$, the dielectric film $12D_1$, the metal film $12M_2$, and the dielectric film $12D_2$, the reflectance change becomes as ①–③ as shown in FIG. 8 in each wavelength band of the three primary colors wavelength bands lights. Furthermore, when their incidence angles in relation to the screen are changed, the reflectance change becomes as ①–③ as shown in FIG. 9 in each wavelength band of the three primary colors wavelength bands lights. As a comparative example, the film thickness dependence of the reflectance change (④–⑥ in FIG. 8), as well as the incidence angle dependence of the reflectance change (④–⑥ in FIG. 9) are shown in terms of the optical membrane.

As shown in FIG. 8, in this embodiment, when the film thickness of the optical multilayer film 12 is changed, the film thickness dependence of the reflectance change becomes smaller compared to in the comparative example. Further, as shown in FIG. 9, in this embodiment, when the incidence angle in relation to the screen is changed, the incidence angle dependence of the reflectance change becomes smaller compared to in the comparative example. In this case, particularly, as Al is used for the metal film $12M_1$ and Nb is used for the metal film $12M_2$, the film thickness dependence of the reflectance change becomes small.

The materials used for the metal film $12M_p$ are not limited to the above-described metal materials, but preferably metal materials that allow for a uniform reflectance in the visible wavelength band. Further, the materials used for the dielectric film $12D_p$ are not limited to the above-described dielectric materials. It is possible to select materials as appropriate corresponding to the optical characteristics of a necessary screen, as there is a trend wherein the larger the refractive index of the dielectric film $12D_p$ is, the larger the half value range of reflection peak in each wavelength band of the three primary colors wavelength bands lights becomes; and the smaller the refractive index is, the smaller the half value range of the reflection peak in wavelength band for each color light becomes.

The light diffusion layer 13 is, for example, a film wherein a microlens array (MLA) is composed, and has flexibility. In this light diffusion layer 13, the three primary colors wavelength bands lights which are reflected on the optical multilayer film 12 are diffused. In result, visual field angle becomes larger, and good visual field characteristics can be obtained. The light diffusion layer 13 can be one wherein a plurality of spherical beads with their diameters of e.g. about several μm to several mm are arranged at even intervals. These beads are made of transparent materials such as glass, polymeric materials or the like. Further, the light diffusion layer 13 can be one, wherein metal fine grains such as silver (Ag), copper (Cu) or the like are dispersed in a given medium.

As described above, in this embodiment, components of the screen: the transparent substrate 11, the optical multilayer film 12, and the light diffusion layer 13 all have the flexibility. Therefore, the screen itself has the flexibility.

A description will now be made about methods of manufacturing the projection screen 10 having such constitution. First, the transparent substrate 11 made of the above-described polymeric materials is prepared. Next, the optical multilayer film 12 is formed by alternately layering the metal films $12M_p$ and the dielectric films $12D_p$ on the transparent substrate 11 by using e.g. spattering. Design is made so that, as described above, each film thickness of this optical multilayer film 12 has the high reflection characteristics in relation to the three primary colors wavelength bands lights of red, green, and blue wavelength bands lights, and has the high absorption characteristics in relation to the lights other than the three primary colors wavelength bands lights.

The optical multilayer film 12, specifically, has 4-layers constitution comprising the metal film $12M_1$ made of Nb, the dielectric film $12D_1$ made of $Nb_2O_5$, the metal film $12M_2$ made of Nb, and the dielectric film $12D_2$ made of $Nb_2O_5$. Film thicknesses are 40 nm for the metal film $12M_1$, 553 nm for the dielectric film $12D_1$, 20 nm for the metal film $12M_2$, and 553 nm for the dielectric film $12D_2$. In result, the optical multilayer film 12 has high reflectance, e.g. reflectance of 70% in relation to the three primary colors wavelength bands lights; has high absorptance e.g. absorptance of 80% or more in relation to the lights other than the three primary colors wavelength bands lights: and has transmittancy of e.g. 5–10% in relation to all wavelength bands lights (FIG. 4).

Further, the optical multilayer film 12 has 4-layers constitution comprising the metal film $12M_1$ made of Al, the dielectric film $12D_1$ made of $Nb_2O_5$, the metal film $12M_2$ made of Nb, and dielectric film $12D_2$ made of $Nb_2O_5$. Film thicknesses are 50 nm for the metal film $12M_1$, 551 nm for the dielectric film $12D_1$, 15 nm for the metal film $12M_2$, and 551 nm for the dielectric film $12D_2$. In result, the optical multilayer film 12 has high reflectance, e.g. reflectance of 80% in relation to the three primary colors wavelength bands lights; has high absorptance e.g. absorptance of 90% or more in relation to the lights other than the three primary colors wavelength bands lights: and has transmittancy of e.g. approximate 0% in relation to all wavelength bands lights (FIG. 7).

Lastly, by affixing the light diffusion layer 13 wherein e.g. the microlens array (MLA) is formed, on the optical multilayer film 12, the projection screen 10 shown in FIG. 3 is completed.

As described above, in this embodiment, not only the black level of images is improved by giving a function as a light absorption layer to the transparent substrate 11, but also the white level of images is improved by forming the optical multilayer film 12. Thus, the light-dark contrast of images is raised and clear images can be obtained. Therefore, it becomes unnecessary to devise surface shape of the screen by e.g. forming convex parts to raise the light-dark contrast of images as conventional. As a result, labor and time are saved, and manufacturing cost is reduced.

Further, in this embodiment, as the optical multilayer film 12 has the constitution wherein the metal films $12M_p$ and the dielectric films $12D_p$ are alternately layered, the film thickness dependence of reflectance becomes smaller, and the incidence angle dependence of the reflectance change becomes smaller, compared to in the comparative example. Therefore, its manufacturing profit margin becomes large, its manufacturing cost is further reduced, and its productivity is improved.

Figure 10:
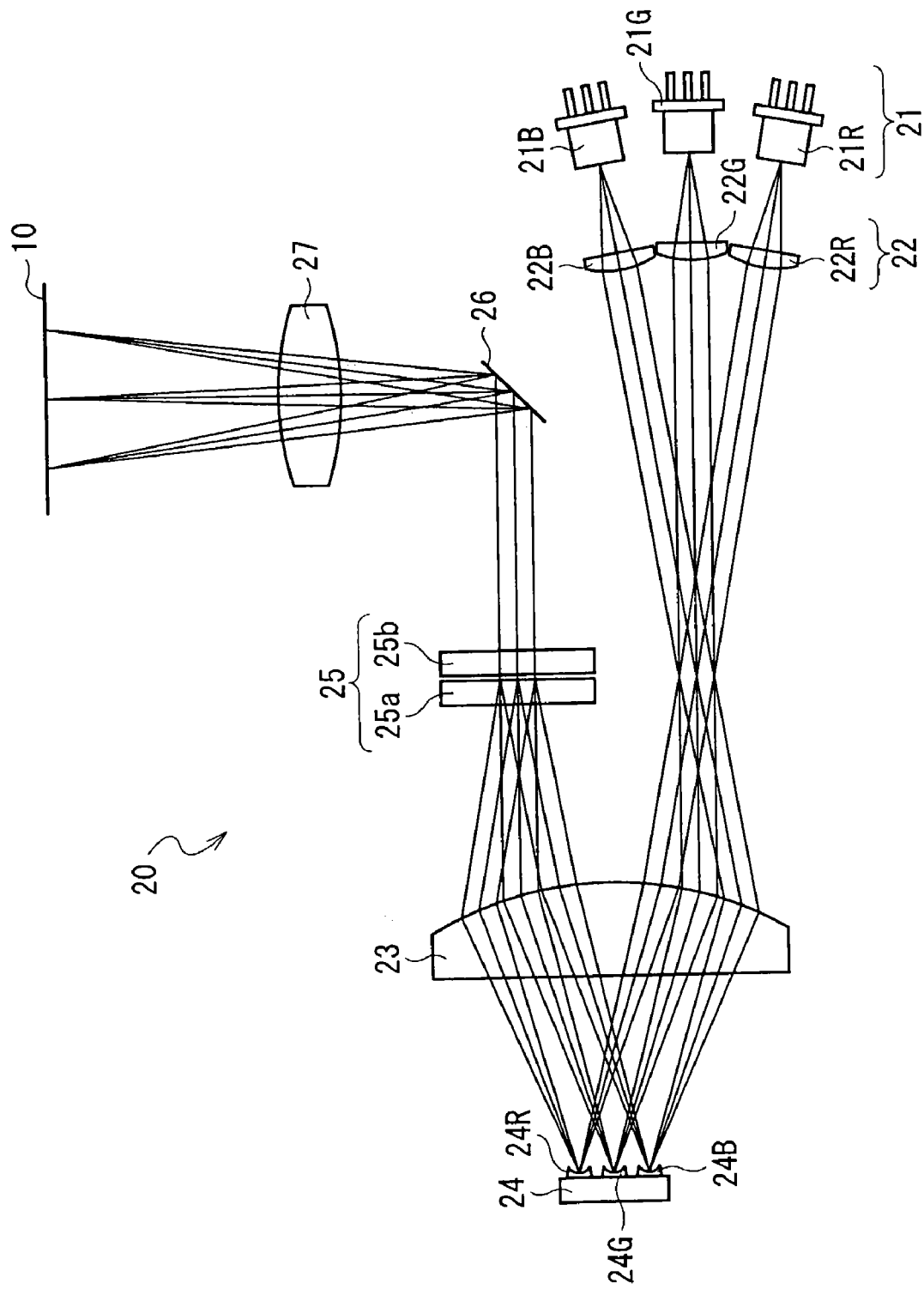
FIG. 10 is a schematic constitution view of a projector unit using the projection screen shown in FIG. 3.

The projection screen 10 having such constitution is used, for example, as a screen for a front-type projector unit 20. FIG. 10 shows an outline constitution of this projector unit 20. The projector unit 20 comprises a laser oscillator 21 emitting the three primary colors narrow-spectrum lights comprised of each wavelength band for the three primary colors as a light source. The laser oscillator 21 comprises, for example, a laser oscillator 21R emitting a red light whose wavelength is 642 nm, a laser oscillator 21G emitting a green light whose wavelength is 532 nm, and a laser oscillator 21B emitting a blue light whose wavelength is 457 nm.

Further, the projector unit 20 comprises a collimator lens 22, a cylindrical lens 23, a GLV 24, a volume type hologram element 25, a galvanometer mirror 26, and a projection lens 27 as an illumination optical system to lead lights emitted from the laser oscillator 21 to the projection screen 10 as image lights. The collimator lens 22 comprises a collimator lens for red light 22R, a collimator lens for green light 22G, and a collimator lens for blue light 22B. The GLV 24 comprises an array of ribbons for red light 24R, an array of ribbons for green light 24G, and an array of ribbons for blue light 24B. The volume type hologram element 25 comprises a first volume type hologram element 25a and a second volume type hologram element 25b.

In the projector unit 20, components are arranged so that the red light emitted from the laser oscillator 21R, the green light emitted from the laser oscillator 21G, and the blue light emitted from the laser oscillator 21B respectively enter the collimator lenses 22R, 22G, and 22B for each color in terms of the collimator lens 22, and enter the arrays of ribbons 24R, 24G, and 24B for each color in terms of the GLV 24.

In the projector unit 20 having such constitution, red, green, and blue lights emitted from the laser oscillator 21 become parallel lights via passing through the collimator lens 22. The three primary colors wavelength bands lights which become parallel lights by this collimator lens 22 are collected at the GLV 24 by the action of the cylindrical lens 23. These collected three primary colors wavelength bands lights are spatially modified by activating each array of ribbons of the GLV 24 corresponding to image signals.

The modified three primary colors wavelength bands lights by the action of the GLV 24 are collected at the volume type hologram element 25 by the action of the cylindrical lens 23. In this volume type hologram element 25, the red light is diffracted by the first volume type hologram element 25a and the blue and red lights are diffracted in the same direction by the second volume type hologram element 25b. Further, in the first volume type hologram element 25a and the second volume type hologram element 25b, the green light is not diffracted, goes straight, passes through, and is emitted in the same direction as of the red light. In this way, by the action of the volume type hologram element 25, red, green, and blue lights are combined and emitted in the same direction. The three primary colors wavelength bands lights emitted in the same direction are scanned in a given direction by the galvanometer mirror 26, and projected on the front face of the projection screen 10 via the projection lens 27.

In the projection screen 10 of this embodiment, outside lights along with the three primary colors bands lights projected from the projector unit 20 enter the optical multilayer film 12 through the light diffusion layer 13. As this optical multilayer film 12 has the reflection characteristics as shown in FIGS. 4 and 7, on this optical multilayer film 12, the three primary colors wavelength bands lights are reflected, and the lights other than the three primary colors wavelength bands lights are absorbed. The three primary colors wavelength bands lights reflected on the optical multilayer film 12 enter the light diffusion layer 13, are diffused by this light diffusion layer 13, and images are formed on the front face of the screen. Then, as the white level and the black level are raised by the optical multilayer film 12, high light-dark contrast images can be formed. Therefore, clear images can be obtained without being influenced by projection environments.

Further, as the optical multilayer film 12 has a constitution, wherein the metal films $12M_p$ and dielectric films $12D_p$ are alternately layered, good visual field characteristics can be obtained compared to the comparative example. For example, in the case where in the optical multilayer film 12, Nb is used for the metal film $12M_1$, $Nb_2O_5$ is used for the dielectric film $12D_1$, Nb is used for the metal film $12M_2$, and $Nb_2O_5$ is used for the dielectric film $12D_2$, and the total number of layers is four, the film thickness dependence of the reflectance change becomes smaller compared to in the comparative example as shown in FIG. 5, and the incidence angle dependence of the reflectance change becomes smaller compared to in the comparative example as shown in FIG. 6, resulting in gaining good visual field characteristics. Furthermore, for example, in the case where Al is used for the metal film $12M_1$, $Nb_2O_5$ is used for the dielectric film $12D_1$, Nb is used for the metal film $12M_2$, and $Nb_2O_5$ is used for the dielectric film $12D_2$, and the total number of layers is four, the film thickness dependence of the reflectance change becomes smaller compared to in the comparative example as shown in FIG. 8, and the incidence angle dependence of the reflectance change becomes smaller compared to in the comparative example as shown in FIG. 9, resulting in gaining wide visual field. Therefore, the visual characteristics can be improved, and its screen size can be enlarged.

Further, as upper part on the transparent substrate 11 is made of polymeric materials, and the optical multilayer film 12 has a constitution, wherein the metal films $12M_p$ and the dielectric films $12D_p$ are alternately layered, the screen has flexibility, resulting in improved storage efficiency.

Further, the light-dark contrast of images is raised and clear images can be obtained by forming the optical multilayer film 12. Therefore, it is unnecessary to devise surface shape of the screen by e.g. forming convex parts to raise the light-dark contrast of images as conventional. In result, labor and time are saved, and its manufacturing cost can be reduced. Furthermore, as the optical multilayer film 12 has a constitution wherein the metal films $12M_p$ and the dielectric films $12D_p$ are alternately layered, the film thickness dependence of the reflectance change becomes smaller, and the incidence angle dependence of the reflectance change becomes smaller, compared to in the comparative example. Therefore, its manufacturing profit margin can be enlarged, and in result, its manufacturing cost can be further reduced and its productivity can be improved.

Figure 11:
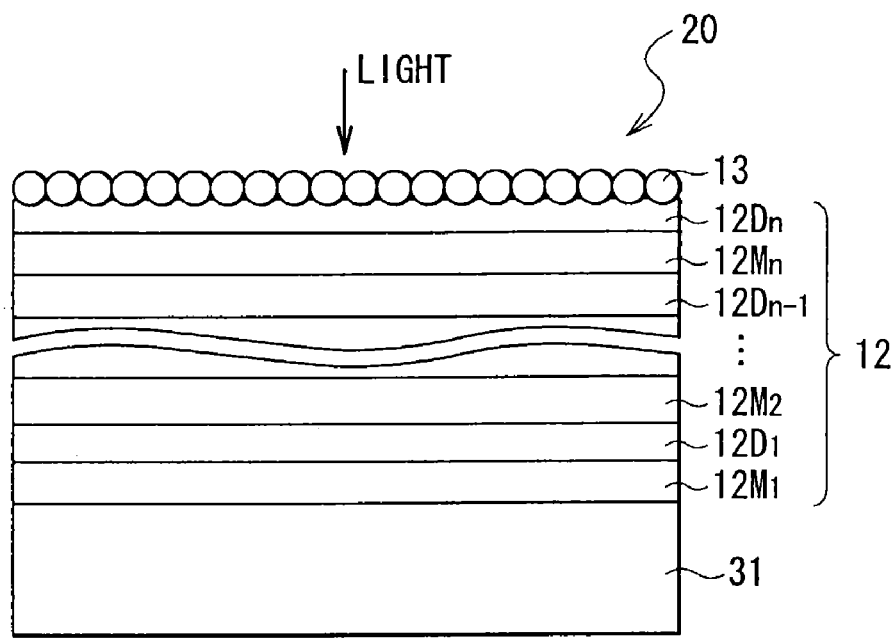
FIG. 11 is a schematic constitution view of a modified example of the projection screen.
Figure 12:
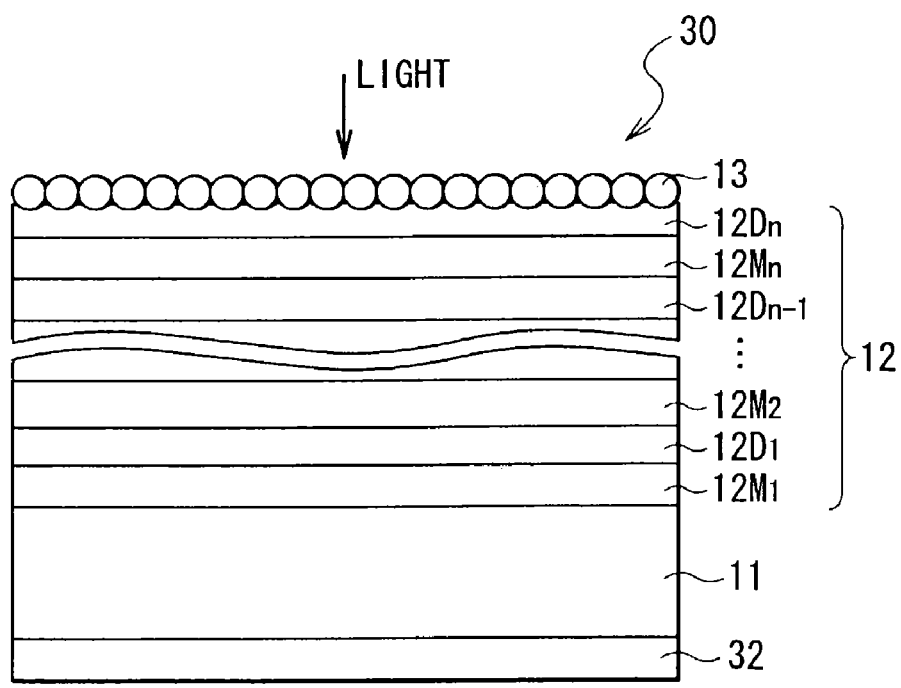
FIG. 12 is a schematic constitution view of a modified example of the projection screen.

While the transparent substrate 11 is used as a substrate in the first embodiment, as a projection screen 20 shown in FIG. 11, for example, a black substrate 31 made of polymeric materials containing blacking and the like can be used so that the substrate itself has a function as a light absorption layer. Additionally, as a projection screen 30 shown in FIG. 12, a light absorption layer 32 made of blacking can be separately formed on the back side of a transparent substrate 11. Further, it is possible to use the transparent substrate 11 as a substrate and separately provide a black substrate on the back side of this transparent substrate 11.

Further, a dielectric film can be formed between the transparent substrate 11 and the metal film $12M_1$. This dielectric film is made of, for example, niobium pentoxide ($Nb_2O_5$), titanium dioxide ($TiO_2$), tantalum pentoxide ($Ta_2O_5$), allumina ($Al_2O_3$), or silicon dioxide ($SiO_2$).

Further, in the embodiment, the light diffusion layer 13 is formed on the optical multilayer film 12, so that the three primary colors wavelength bands lights which are reflected on the optical multilayer film 12 are diffused by this light diffusion layer 13. However, it is possible to form a light diffusion part having a plurality of convex parts or a plurality of concave parts on the surface of the transparent substrate 11, and to form on this light diffusion part, the optical multilayer film 12 which has the same shape as convex parts or concave parts, which has the high reflection characteristics in relation to the specific wavelength bands lights, and which has the high absorption characteristics in relation to at least the lights in the visible wavelength band other than the above-described wavelength bands.

[Second Embodiment]

Figure 13:
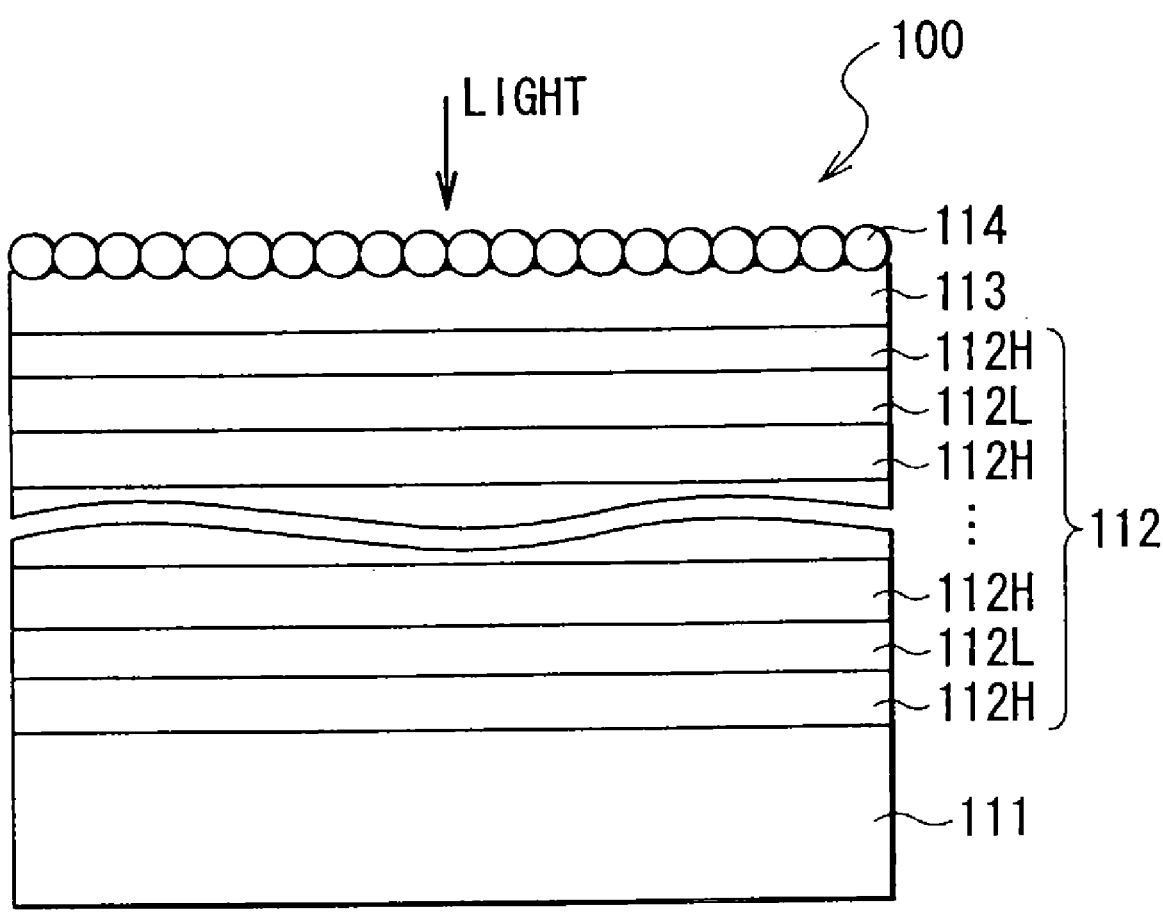
FIG. 13 is a cross sectional constitution view of a projection screen according to a second embodiment of the invention.

FIG. 13 shows a cross-sectional constitution of part of a projection screen 100 according to a second embodiment of the invention. This projection screen 100 is, namely, a reflection type projection screen. The projection screen 100 comprises a black substrate 111. On the black substrate 111, as light reflection layer, an optical multilayer film 112 that has a function e.g., namely, as a band-pass filter is formed. This optical multilayer film 112 is made of, for example, solvent materials and has flexibility. On the optical multilayer film 112, an angle correction layer 113 is formed. This angle correction layer 113 has a function which allows lights to enter in a direction perpendicular to the surface of the optical multilayer film 112. Details about the optical multilayer film 112 and the angle correction layer 113 will be described later. On the angle correction layer 113, a light diffusion layer 114 is formed.

The black substrate 111 is made of polymeric materials containing e.g. blacking or the like, has thickness of e.g. 188 μm and flexibility. As the polymeric materials, for example, polycarbonate (PC), polyethylene terephthalate (PET), polyethylene naphthalate (PEN), polyether sulfone (PES), or polyolefin (PO) are listed. As the color of this black substrate 111 is black due to blacking, the black substrate 111 has a function as a light absorption layer which absorbs the lights passing through the optical multilayer film 112. Therefore, the black level of the screen can be raised.

The optical multilayer film 112 is a film made by alternately layering high refractive index films 112H and low refractive index films 112L that have lower refractive indices than that of the high refractive index films 112H. More specifically, the high refractive index films 112H are made of solvent materials such as a thermosetting resin, Opster made by JSR Corporation (JN7102, refractive index: 1.68); and the low refractive index films 112L are made of solvent materials, such as a thermosetting resin, Opster made by JSR Corporation (JN7215, refractive index: 1.41). Thus, the optical multilayer film 112 has the flexibility.

Each film thickness of the optical multilayer film 112 is designed to have the high reflection characteristics, for example, reflectance of 80% or more in relation to the three primary colors wavelength bands lights comprised of lights in each wavelength band of red, green and blue, for example. Additionally, each film thickness of the optical multilayer film 112 is designed to have the high transmission characteristics, for example, transmittancy of 80% or more in relation to at least lights in the visible wavelength bands lights other than the three primary colors wavelength bands lights. Each film thickness of the optical multilayer film 112 is designed so that an optical thickness of each film nd satisfies the following Equation 2 in relation to a wavelength of incidence light λ:

$$nd = \lambda(\alpha \pm \frac{1}{4}) \text{ (provided } \alpha \text{ is a natural number)} \quad \text{[Equation 2]}$$

where each film thickness is d, a refractive index of each film is n, and a wavelength of incidence light which enters this optical multilayer film is λ.

Figure 18:
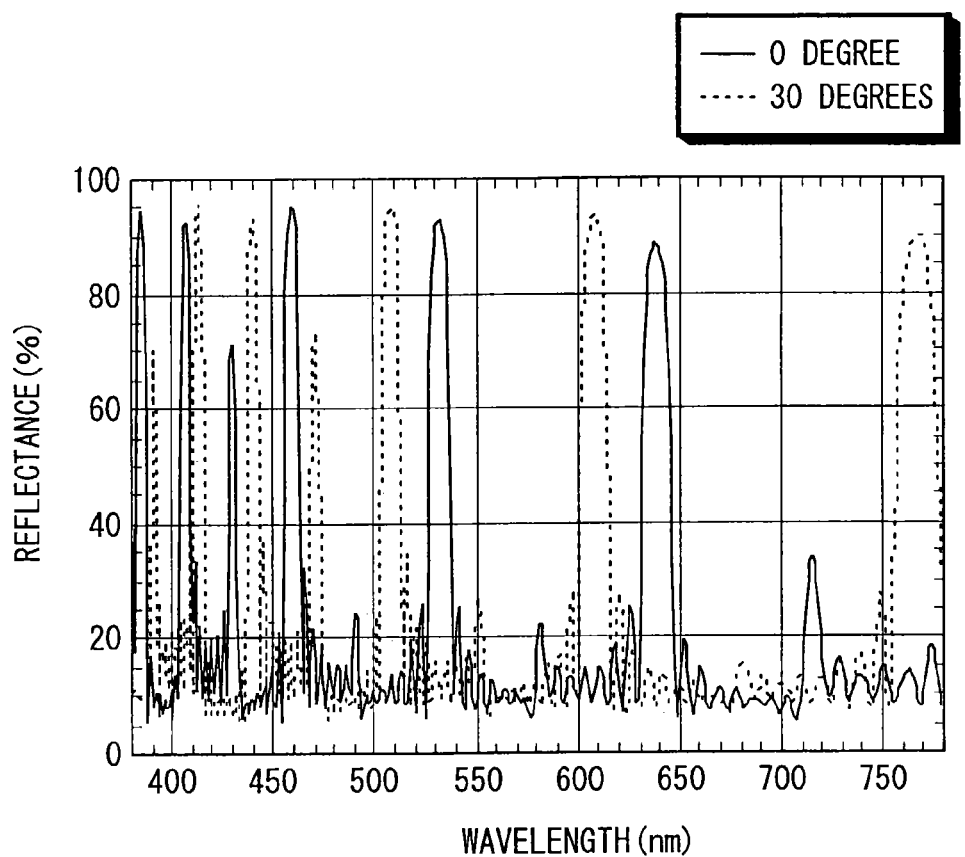
FIG. 18 illustrates the reflection characteristics of an optical multilayer film of the projection screen shown in FIG. 13.

More specifically, design is made so that the high refractive index films 112H and the low refractive index films 112L are made of the thermosetting resins with the above-mentioned refractive indices; and the optical multilayer 112, as shown in full line in FIG. 18, has the high reflectance such as 80% in relation to the three primary colors wavelength bands lights (red light wavelength of 642 nm, green light wavelength of 532 nm, and blue light wavelength of 457 nm), and has the high transmission characteristics such as reflectance of 20% in relation to at least the lights in the visible wavelength band other than the lights in these three primary colors wavelength bands. Due to such design, thickness of the high refractive index film 112H is 1023 nm, thickness of the low refractive index film 112L is 780 nm, nine high refractive index films 112H and nine low refractive index films 112L are alternately layered, and on the top of that layered films, the high refractive index film 112H is layered. As the optical multilayer film 112 having such constitution has the high reflection characteristics in relation to the three primary wavelength bands lights, the white level of the screen can be raised. Further, the optical multilayer film 112 has flexibility as it is made of the solvent materials. Each wavelength of the three primary colors wavelength bands lights is the wavelength of each color laser emitted from the light source (laser oscillator 21) of the above-mentioned projector unit 20 (FIG. 10).

The high refractive index films 112H and the low refractive index films 112L are not limited to the heat-hardening resins. For the high refractive index films 112H, for example, resins mixed with fine grains of titanium dioxide ($TiO_2$) can be used to obtain refractive index of 1.9. For the low refractive index films 112L, for example, fluorinated resins can be used to obtain refractive index of 1.2. In the case where the materials with such refractive indices are used, the total number of the layers becomes seven. In this way, as the larger the difference of refractive index between the high refractive index films 112H and the low refractive index films 112L is, the fewer the total number of the layers of the high refractive index films 112H and the low refractive index films 112L becomes. Therefore, enlarging the difference of refractive index between these films is preferable in terms of the productivity.

The angle correction layer 113 is, for example, a flexible plastic substrate that is processed in the shape of a Fresnel lens, and has a function to allow the lights to enter in a direction perpendicular to the surface of the optical multilayer film 112. The Fresnel lens is a lens which is made by concentrically dividing a spherical surface of a spherical lens and arranging the divided spherical surface concentrically, namely, a lens wherein a plurality of grooves are arranged concentrically based on the center of the lens. These grooves are designed so that errors of focus location is corrected for each groove.

Figure 14:
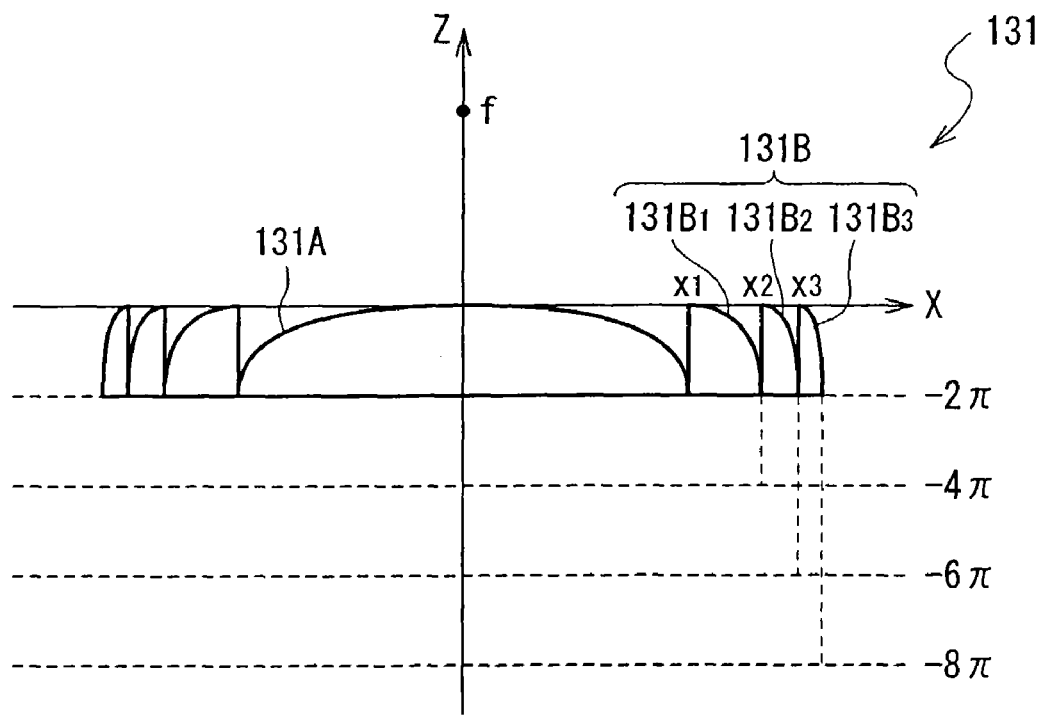
FIG. 14 shows a Fresnel lens used for an angle correction layer of the projection screen shown in FIG. 13.
Figure 15:
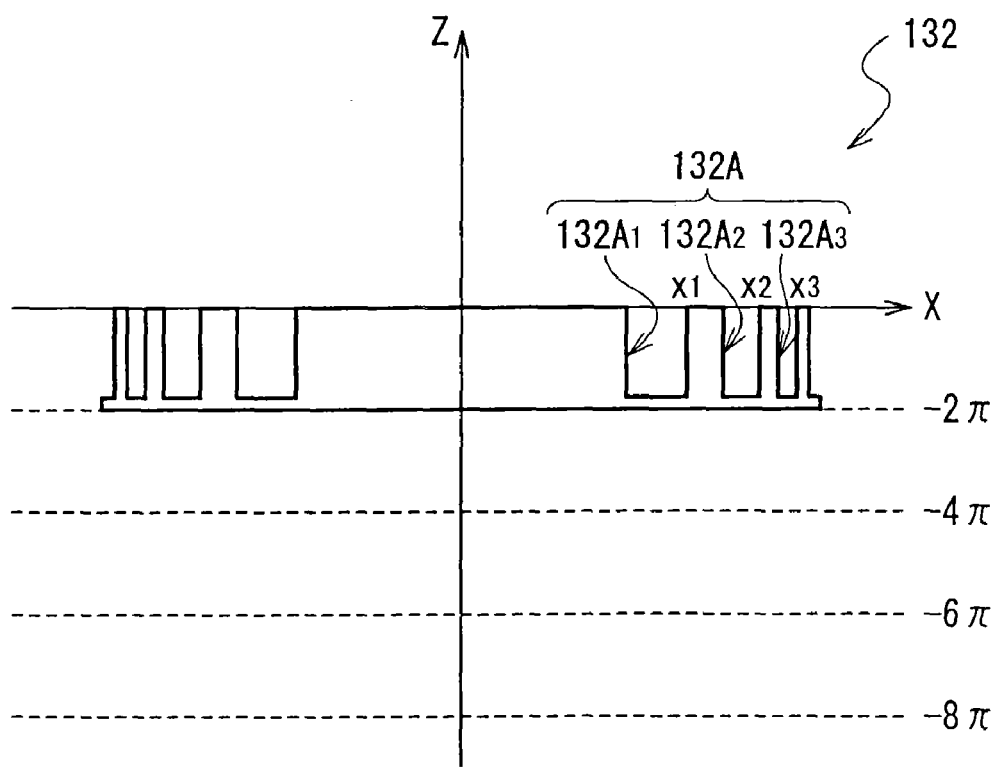
FIG. 15 shows a Fresnel lens used for the angle correction layer of the projection screen shown in FIG. 13.

In this embodiment, the angle correction layer 113 is processed, for example, in the shape of a Fresnel lens 131 (FIG. 14) or a Fresnel lens 132 (FIG. 15). In the case of the Fresnel lens 131, its cross-sectional shape has a curved surface structure 131A in its center, and saw blade structures 131B on both ends of that curved surface. The saw blade structures 131B are provided with a plurality of grooves at an angle of given degrees, and comprised of a plurality of saw blades $131B_m$ (provided m is 1, 2, or 3). The curved surface structure 131A and the saw blade structures 131B are designed to meet a phase Φ(x) shown in Equation 3 and a coordinate $x_m$ shown in Equation 4. $x_m$ corresponds to boundary coordinates between the curved surface structure 131A and the saw blade structures 131B, or boundary coordinates between the adjacent saw blades $131B_m$ of the saw blade structures 131B, respectively. λ is a wavelength of an incidence light, and f is a focal length. The wavelength of the incidence light λ is a wavelength for each color of the three primary colors wavelength bands lights, for example, a wavelength of red light is 642 nm, a wavelength of green light is 532 nm, and a wavelength of blue light is 457 nm.

$$\Phi(x) = 2\pi \frac{f - \sqrt{f^2 + x^2}}{\lambda} = -2m\pi \quad \text{[Equation 3]}$$

$$X_m = \sqrt{m^2\lambda^2 + 2mf\lambda} \quad \text{[Equation 4]}$$

In the Fresnel lens 132, the curved surface of the curved surface structure 131A and the saw blade structures 131B is deformed into the plain surface, with groove structures 132A. The groove structures 132A comprise a plurality of grooves $132A_m$. The plurality of grooves $132A_m$ are designed to meet the phase Φ(x) shown in Equation 3 and the coordinate $x_m$ shown in Equation 4 as in the Fresnel lens 131. Coordinates on the right side surface of the grooves $132A_m$ are $x_m$.

Figure 16:
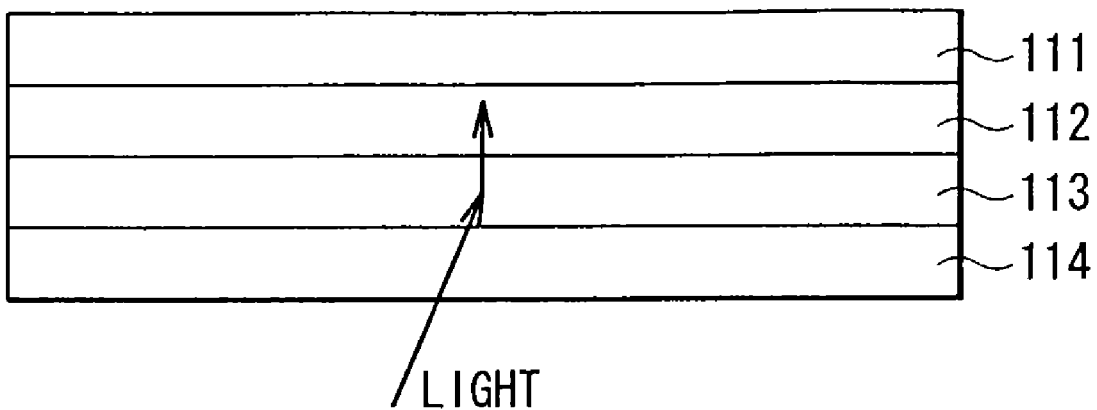
FIG. 16 is a schematic view to illustrate the case where a light obliquely enters the projection screen shown in FIG. 13.

As described above, the angle correction layer 113 is processed in the shape of the Fresnel lens 131 or the Fresnel lens 132. Therefore, as shown in FIG. 16, in the case where the three primary colors wavelength bands lights enter e.g. at an angle of 30 degrees in relation to the direction perpendicular to the screen, these incidence lights are diffracted by the angle correction layer 113, and enter in a direction perpendicular to the optical multilayer film 112. Thus, lowering of the optical characteristics of the optical multilayer film 112 is prevented, and the color shift hardly occurs. The angle correction layer 113 is thin and plain, as it is processed in the shape of the Fresnel lens 131 or the Fresnel lens 132.

The light diffusion layer 114 is, for example, a film wherein a microlens array (MLA) is formed, and has flexibility. At this light diffusion layer 114, the three primary colors wavelength bands lights passing through the optical multilayer film 112 are diffused. Thus, the visual field angle is enlarged, and good visual field characteristics can be obtained. The light diffusion layer 114 can be one wherein e.g. a plurality of spherical beads whose diameters are about several μm to several mm are arranged at even intervals. These beads are made of transparent materials such as glass, polymeric materials or the like. Further, the light diffusion layer 114 can be one wherein metal fine grains such as silver (Ag), copper (Cu) or the like are dispersed in a given medium.

As described above, in this embodiment, as components of the screen: the black substrate 111, the optical multilayer film 112, the angle correction layer 113, and the light diffusion layer 114 have all flexibility, the screen itself has flexibility.

A description will now be made about methods of manufacturing the projection screen 100 having such constitution. First, the black substrate 111 made of polymeric materials containing blacking is prepared. Next, the optical multilayer film 112 is formed by alternately layering the high refractive index films 112H and the low refractive index films 112L that are made of solvent materials on the black substrate 111 by using coating method such as spin coating in the atmosphere, for example. This optical multilayer film 112 has the flexibility. Each film thickness of the optical multilayer film 112 is designed to have the high reflection characteristics in relation to the three primary colors wavelength bands lights comprised of the lights in each wavelength band of red, green and blue, for example. Additionally, each film thickness of the optical multilayer film 112 is designed to have the high transmission characteristics in relation to at least the lights in the visible wavelength band other than these three primary colors wavelength bands lights.

More specifically, as shown in full line in FIG. 18, the optical multilayer 112 is designed to have high reflectance such as 80% in relation to the three primary colors wavelength bands lights (red light wavelength of 642 nm, green light wavelength of 532 nm, and blue light wavelength of 457 nm), and have the high transmission characteristics such as reflectance of 20% or under in relation to at least the lights in the visible wavelength band other than these three primary colors wavelength bands lights. To form the optical multilayer film 112 designed as above, firstly, as a solvent material, the thermosetting resin, Opster made by JSR Corporation (JN7102, refractive index: 1.68) is applied on the black substrate 111 by coating method with Cap Coater made by Hirano Tecseed Co., Ltd. Then, by providing heat treatment to it at 120 degrees for 10 minutes, the high refractive index film 112H is formed. The thickness of the high refractive index film 112H is 1023 nm. Here, in the case where the thickness of the high refractive index film 112H is more than 1023 nm, desired thickness is obtained by providing the high refractive index film 112H with etching treatment such as oxygen plasma etching or the like, over monitoring the reflection characteristics or the like of the high refractive index film 112H.

Next, as a solvent material, the thermosetting resin, Opster made by JSR Corporation (JN7215, refractive index: 1.41) is applied on the high refractive index film 112H by using the above-mentioned Cap Coater as in the high refractive index film 112H. Then, by providing heat treatment to it at 120 degrees for 60 minutes, the low refractive index film 112L is formed. The thickness of the low refractive index film 112L is 780 nm. Here, in the case where the thickness of the low refractive index film 112L is more than 780 nm, desired thickness is obtained by providing the low refractive index film 112L with etching treatment with the method similar to in the high refractive index film 112H. By repeating such process, nine high refractive index films 112H and nine low refractive index films 112L are alternately layered, and then on the top of that layered films, the high refractive index film 112H is layered. In this way, the optical multilayer film 112 having the reflection characteristics shown in full line in FIG. 18 is formed.

Subsequently, the angle correction layer 113 is attached on the optical multilayer film 112. This angle correction layer 13 is a layer made by processing the flexible plastic substrate in the shape of the Fresnel lens 131 or the Fresnel lens 132. In the case where the angle correction layer 113 is processed in the shape of the Fresnel lens 131, the cross-sectional shape is formed so as to have the curved surface structure 131A in the center, and the saw blade structures 131B wherein the plurality of grooves are formed at an angle of given degrees on both sides of the curved surface. The saw blade structures 131B form the plurality of grooves at an angle of given degrees, and comprise the plurality of saw blades $131B_m$ (provided m is 1, 2, or 3). The curved surface structure 131A and the saw blade structures 131B are designed to meet the phase $\Phi(x)$ shown in Equation 3 and the coordinate $x_m$ shown in Equation 4.

In the case where the angle correction layer 113 is processed in the shape of the Fresnel lens 132, the curved surface in the curved surface structure 131A and the saw blade structures 131B is deformed into the plane surface, and the groove structures 132A are formed. These groove structures 132A have the plurality of grooves $132A_m$. These grooves $132A_m$ are designed to meet the phase $\Phi(x)$ shown in Equation 3 and the coordinate $x_m$ shown in Equation 4 as in the Fresnel lens 131. The wavelength of the incidence light $\lambda$ is the wavelength for each color of the three primary colors wavelength bands lights. For example, a wavelength of red light is 642 nm, a wavelength of green light is 532 nm, and a wavelength of blue light is 457 nm. The angle correction layer 113 becomes thin and plain as it is processed in the shape of the Fresnel lens 131 or the Fresnel lens 132.

Lastly, by attaching the light diffusion layer 114, wherein e.g. the microlens array (MLA) is formed, on the optical multilayer film 112, the projection screen 100 shown in FIG. 13 is completed.

As desired above, in this embodiment, not only by improving the black level of images by providing the black substrate 111 with the function as the light absorption layer, but also by improving the white level of images by forming the optical multilayer film 112, the light-dark contrast of the images is raised and clear images can be obtained. Therefore, it becomes unnecessary to devise the surface shape of the screen by e.g. forming convex parts to raise the light-dark contrast of the images as conventional. In result, labor and time can be saved, leading to reduced manufacturing cost.

In this connection, the same applicant as the applicant of this application has proposed a projection screen having an optical membrane made of inorganic materials (Patent application No. 2002-070799). This optical membrane is a membrane made by alternately layering high refractive index layers and low refractive index layers whose refractive indices are lower than of these high refractive index layers. As the inorganic materials for the high refractive index layers, for example, niobium pentoxide ($Nb_2O_5$), titanium dioxide or tantalum pentoxide ($Ta_2O_5$) are used; and as the inorganic materials for the low refractive index layers, for example, silicon dioxide ($SiO_2$) or magnesium fluoride ($MgF_2$) are used. The optical membrane made of such inorganic materials is formed by using vacuum method such as sputtering. On the other hand, in this embodiment, as the optical multilayer film 112 is formed by using coating method in the atmosphere, its manufacturing cost can be reduced compared to in the case of using the vacuum process.

The projection screen 100 having such constitution is used, for example, as a screen for the above-described front-type projector unit 20 (FIG. 10).

Figure 17:
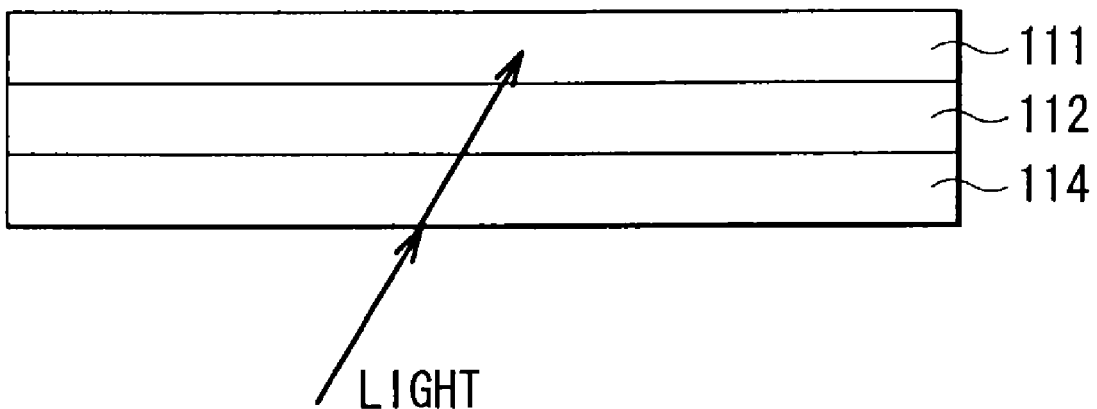
FIG. 17 is a schematic view to illustrate the case where a light obliquely enters a projection screen of a comparative example.

In the projection screen 100, with the outside light, the primary three colors wavelength bands lights projected from this projector unit 20 pass through the light diffusion layer 114 and the angle correction layer 113, and enter the optical multilayer film 112. As shown in FIG. 17, in the case where the angle correction layer 113 is not formed, when the three primary colors wavelength bands lights enter e.g. at an angle of 30 degrees in relation to the direction perpendicular to the screen, they obliquely enter the optical multilayer film 112. Therefore, the three primary colors wavelength bands lights reflected on the optical multilayer film 112 change from the desired optical characteristics and the color shift occurs (dotted line in FIG. 18). Meanwhile, in this embodiment, the angle correction layer 113 is formed on the optical multilayer film 112, and this angle correction layer 113 has the function as the Fresnel lens. Therefore, the three primary colors wavelength bands lights are diffracted by this angle correction layer 113, and enter in a direction perpendicular to the optical multilayer film 112 as shown in FIG. 16.

In this optical multilayer film 112, the three primary colors wavelength bands lights are reflected, and at least the lights in the visible wavelength band other than the three primary colors wavelength bands lights pass through and are absorbed into the black substrate 111. Then, the three primary colors wavelength bands lights reflected on the optical multilayer film 112 hardly produce the color shift as shown in full line in FIG. 18, and are reflected with the desired optical characteristics. In this way, the three primary colors wavelength bands lights enter the light diffusion layer 114, are diffused by this light diffusion layer 114, and images are formed on the front face of the screen.

Then, not only the black level is raised by the black substrate 111, but also the white level is raised by the optical multilayer film 112. Therefore, images with high light-dark contrast are formed. Further, lowering of the optical characteristics of the optical multilayer film 112 is prevented by the angle correction layer 113, and the color shift hardly occurs. Therefore, images with high color contrast are formed.

As described above, in this embodiment, the optical multilayer film 112 has the high reflection characteristics in relation to the three primary colors wavelength bands lights, and the high transmission characteristics in relation to at least the lights in the visible wavelength band other than three primary colors wavelength bands lights, so that the white level of images can be raised. Therefore, clear images can be obtained without being influenced by projection environments. Further, the angle correction layer 113 is formed on the optical multilayer film 112. Thus, even in the case where incidence lights obliquely enter the screen, the three primary colors wavelength bands lights enter in a direction perpendicular to the optical multilayer film 112 by this angle correction layer 113, so that lowering of the optical characteristics of the optical multilayer film 112 is prevented, and the color shift hardly occurs. As a result, since the color contrast can be raised, vivid images can be obtained, and its screen size can be enlarged. Furthermore, as the optical multilayer film 112 is formed on the black substrate 111 made of polymeric materials by using the solvent materials, the screen became flexible, resulting in improved storage efficiency.

Further, not only by improving the black level of images by giving a function as an optical absorption layer to the black substrate 111, but also by improving the white level of images by forming the optical multilayer film 112, the light-dark contrast of images is raised and clear images can be obtained. Therefore, it becomes unnecessary to devise surface shape of the screen by e.g. forming convex parts to raise the light-dark contrast of the images as conventional. In result, labor and time can be saved, resulting in reduced manufacturing cost. Furthermore, as the optical multilayer film 112 is formed by using coating method, its manufacturing cost can be reduced compared to in the case of forming by the vacuum process.

While the invention has been described with respect to the second embodiment, this invention is not limited to the above-described embodiment, and various modifications are possible. For example, while in the embodiment, the optical multilayer film 112 is formed by using the thermosetting resin that is cured by heating as a solvent material, a thermosetting resin that is cured by illuminating ultraviolet light can be used alternatively.

Further, while in the embodiment, the plastic substrate made of plastic materials is used for the angle correction layer 113, a substrate made of materials other than plastic materials can be used. For example, a substrate made of glass materials can be used. Furthermore, while in the embodiment, the angle correction layer 113 is processed in the shape of the Fresnel lens 131 or the Fresnel lens 132, it can be processed in the shape of other Fresnel lens. Additionally, while in the embodiment, the angle correction layer 113 is formed on the optical multilayer film 112 made of the solvent materials, it can be formed on the optical multilayer film made of other materials such as inorganic materials. What is more, while in the embodiment, the angle correction layer 113 is formed on the optical multilayer film, it can be formed on any optical reflection layer having a function to reflect lights.

Figure 19:
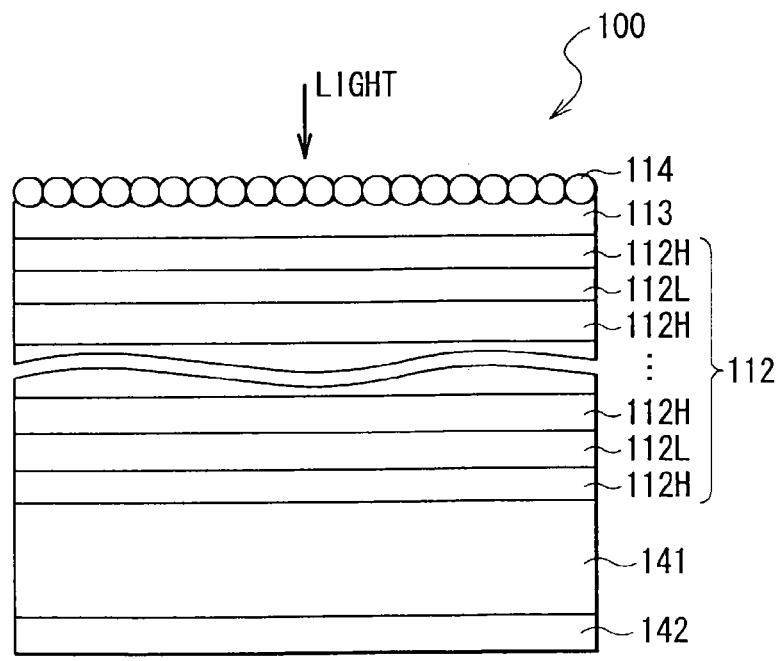
FIG. 19 is a schematic constitution view of a modified example of the projection screen.

Further, while in the embodiment, the black substrate 111 is used as a substrate and this black substrate 111 is provided with the function of the light absorption layer, a transparent substrate 141 can be used as a substrate and a light absorption layer 142 made of blacking can be separately formed on the back side of the transparent substrate 141 (FIG. 19). Additionally, the transparent substrate 141 can be used as a substrate, and a black substrate can be separately provided on the back side of this transparent substrate 141.

As described above, according to the projection screen of the invention, the light selective reflection layer, having the reflection characteristics in relation to the lights in the specific wavelength bands, and having the absorption characteristics in relation to at least the lights in the visible wavelength band other than the lights in the specific wavelength bands is provided on the substrate. Therefore, the white level and the black level of images can be raised. Thus, clear images can be obtained without being influenced by projection environments.

Specifically, due to the constitution of the light selective reflection layer, wherein the metal films and dielectric films are alternately layered, wide visual field angle can be obtained. Therefore, the visual field characteristics can be improved, resulting in obtaining enlarged screen size.

Further, as the substrate is made of polymeric materials, and the light selective reflection layer has the constitution made by alternately layering the metal films and dielectric films, the screen becomes flexible, resulting in improved storage efficiency.

Further, according to the method of manufacturing the projection screen of the invention, by improving the white level and the black level of images by forming the light selective reflection layer, the light-dark contrast of images is raised and clear images can be obtained. Therefore, it becomes unnecessary to devise the surface shape of the screen by e.g. forming the convex parts to improve the light-dark contrast of images as conventional. Thus, its manufacturing cost can be reduced.

In particular, as the light selective reflection layer has the constitution made by alternately layering the metal films and dielectric films, the film thickness dependence of the reflectance change becomes smaller, and the incidence angle dependence of the reflectance change becomes smaller. Therefore, its manufacturing profit margin can be enlarged. In result, its manufacturing cost can be further reduced, and the productivity can be improved.

Furthermore, the angle correction layer is formed on the light selective reflection layer, so that in the case where an incidence light obliquely enters the screen, when allows the light to enter in a direction perpendicular to the face of the light selective reflection layer due to this angle correction layer, lowering of the optical characteristics of the light selective reflection layer can be prevented, and the color shift does not occur. In result, as the color contrast can be raised, clear images can be obtained and its screen size can be enlarged.

Obviously many modifications and variations of the present invention are possible in the light of the above teachings. It is therefore to be understood that within the scope of the appended claims the invention may be practiced otherwise than as specifically described.

What is claimed is:

1. A projection screen, comprising:
a substrate; and
a light selective reflection layer which is formed on one side of the substrate, which has reflection characteristics in relation to lights in specific wavelength bands, and which has absorption characteristics in relation to lights other than the lights in the specific wavelength bands, wherein the light selective reflection layer is an optical multilayer film made by alternately layering metal films and dielectric film, and wherein the light selective reflection layer is made by sequentially layering a first metal film made of Nb, a first dielectric film made of $Nb_2O_5$, a second metal film made of Nb, and a second dielectric film made of $Nb_2O_5$.

2. A projection screen, comprising:
a substrate; and
a light selective reflection layer which is formed on one side of the substrate, which has reflection characteristics in relation to lights in specific wavelength bands, and which has absorption characteristics in relation to lights other than the lights in the specific wavelength bands, wherein the light selective reflection layer is an optical multilayer film made by alternately layering metal films and dielectric films, and wherein the light selective reflection layer is made by sequentially layering a first metal film made of Al, a first dielectric film made of $Nb_2O_5$, a second metal film made of Nb, and a second dielectric film made of $Nb_2O_5$.

3. A method of manufacturing a projection screen, comprising a step of forming a light selective reflection layer having reflection characteristics in relation to specific wavelength bands and having absorption characteristics in relation to lights other than the specific wavelength bands lights on a substrate by using spattering, wherein the light selective reflection layer is an optical multilayer film made by alternately layering metal films and dielectric films, wherein the light selective reflection layer is made by sequentially layering a first metal film made of Nb, a first dielectric film made of $Nb_2O_5$, a second metal film made of Nb, and a second dielectric film made of $Nb_2O_5$.

4. A method of manufacturing a projection screen, comprising a step of forming a light selective reflection layer having reflection characteristics in relation to specific wavelength bands and having absorption characteristics in relation to lights other than the specific wavelength bands lights on a substrate by using spattering, wherein the light selective reflection layer is an optical multilayer film made by alternately layering metal films and dielectric films, wherein the light selective reflection layer is made by sequentially layering a first metal film made of Al, a first dielectric film made of $Nb_2O_5$, a second metal film made of Nb, and a second dielectric film made of $Nb_2O_5$.

* * * * *